United States Patent

[11] 3,609,660

[72] Inventor Frederic C. Doughty
Valley Forge, Pa.
[21] Appl. No. 801,021
[22] Filed Feb. 20, 1969
[45] Patented Sept. 28, 1971
[73] Assignee Burroughs Corporation
Detroit, Mich.

[54] MEMORY WORD LINE SELECTION APPARATUS USING A DOUBLE-DUTY CENTER-TAPPED TRANSFORMER
10 Claims, 4 Drawing Figs.

[52] U.S. Cl. ........ 340/166, 340/147
[51] Int. Cl. ........ H04q 1/00, H04q 3/00
[50] Field of Search ........ 340/166 C, 114

[56] References Cited

UNITED STATES PATENTS

| | | | |
|---|---|---|---|
| 2,931,015 | 3/1960 | Bonn et al. | 340/166 C |
| 2,979,699 | 4/1961 | Goodwin | 340/166 C |
| 3,101,416 | 8/1963 | Masson | 340/166 C |
| 3,112,470 | 11/1963 | Barrett et al. | 340/166 C |
| 3,144,641 | 8/1964 | Raffel | 340/166 C |

*Primary Examiner*—Harold I. Pitts
*Attorney*—Carl Fissell, Jr.

ABSTRACT: The present invention discloses a transformer and its associated circuitry which, when utilized to selectively address the word lines of a computer memory, halves the number of transformers usually required. The transformer disclosed has a pair of primary windings and a single secondary winding. A plurality of diodes are included in the associated circuitry. The apparatus is then shown wired into a memory word selection matrix of n switches and m line drivers.

INVENTOR.
FREDERIC C. DOUGHTY

BY Edward J. Feeney Jr.
ATTORNEY

INVENTOR
FREDERIC C. DOUGHTY
BY Edward J. Feeney Jr.
ATTORNEY

MEMORY WORD LINE SELECTION APPARATUS USING A DOUBLE-DUTY CENTER-TAPPED TRANSFORMER

BACKGROUND OF THE INVENTION

1. Field of the Invention

The proposed invention relates to the field of storage systems. More specifically it relates to the word drive selection apparatus associated with line organized memories. These linear selection memories are random access memories in which each word is addressed by an individual selection element. The addressing of a given word is accomplished by addressing a particular selection element associated, for example, with a thin film memory word line or a word line of magnetic cores. These selection elements are usually driven, in turn, by matrices of row drivers and column switches which have been developed in a variety of well-known forms.

2. DESCRIPTION OF THE PRIOR ART

In many former line selection systems, transformers alone have been used as selection elements. Still other selection systems used only diodes or, as is shown in the present application, a combination of transformers and diodes.

In all of those transformer selection systems known to the inventor an individual transformer was needed at each intersection of the word line selection matrix.

SUMMARY OF THE INVENTION

In the present transformer selection system a single transformer accommodates every two intersections. Thus the number of transformers used is reduced in half. In the configuration herein disclosed, the transformer has a pair of primary windings with a common connection between the two coupled to a driver line. The opposite ends of each of the primary windings are coupled through diodes to a first and a second switch line. The single secondary of the transformer is coupled through a pair of diodes to a first and a second word drive line. It is therefore a basic object of the present invention to provide a word line selection system for a memory system in which a single transformer is utilized to activate a first and a second word line.

It is a further object of the present invention to provide a transformer circuit for such a selection system wherein a first pair of diodes are used in conjunction with a pair of primary windings and a second pair of diodes are used in conjunction with a single secondary winding to provide a circuit for activating a first and second word line which includes a single transformer.

These and other objects will become apparent upon consideration of the remainder of this specification with the accompanying drawings. A specific embodiment, contemplated by the inventor as the best means of carrying out the invention is set forth in the following detailed description which refers to the accompanying drawings.

DESCRIPTION OF THE PREFERRED EMBODIMENT

Figure 1:
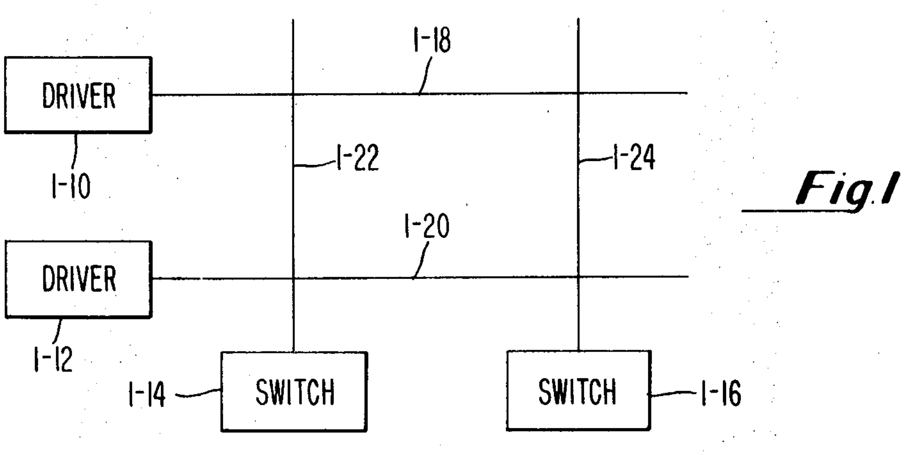
Fig. 1 PRIOR ART
FIG. 1 is a block diagram showing a matrix such as is used in word line selection system.

FIG. 1 illustrates the usual basic selection matrix. A plurality of drivers 1–10, 1–12 are utilized as driving means for each of a plurality of rows 1–18, 1–20, while a plurality of switches 1–14, 1–16 are respectively connected to each of a plurality of columns 1–22, 1–24. The simultaneous activation of the driver 1–10 and the switch 1–14 energizes the row and column lines 1–18 and 1–22 and as a consequence any circuit element connected across the intersection of these two lines in turn would be activated.

Figure 2:
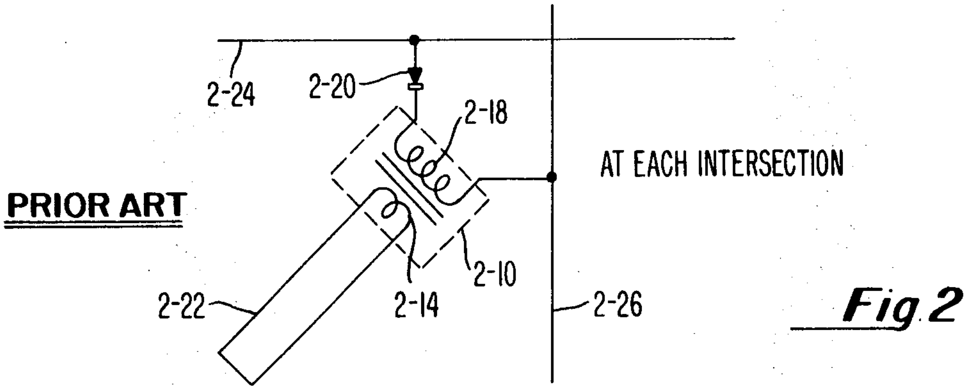
FIG. 2 is a schematic diagram showing an individual intersection with an individual transformer such as has been formerly utilized in the prior art.

In the prior art, as previously mentioned, the scheme usually used in transformer selection systems included the circuit illustrated in FIG. 2. In this figure, a single transformer 2–10 is shown having a primary winding 2–18 and a secondary winding 2–14. The primary winding 2–18 is serially connected to a diode 2–20 and the combination then connected across the intersection of a row line 2–24 and a column line 2–26. The secondary 2–14 is thereafter connected to drive a single word line 2–22. It is believed obvious that such a configuration requires a single transformer at each intersection of the word line address matrix.

Figure 3:
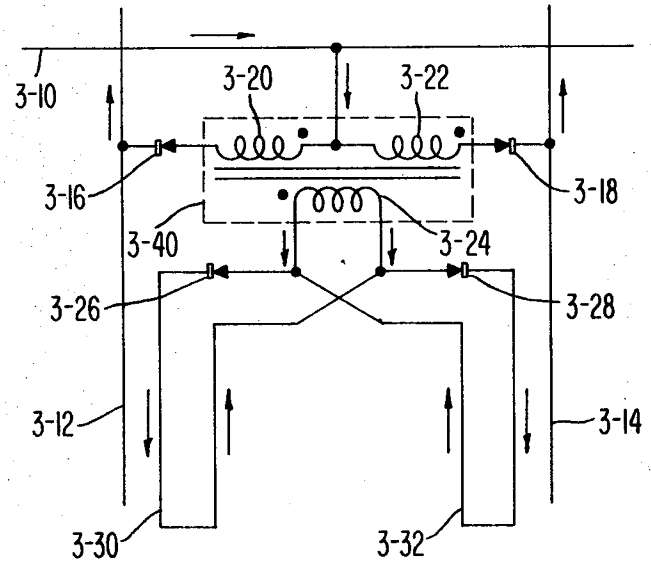
FIG. 3 is a detailed schematic diagram showing a pair of intersections utilizing a single-transformer circuit such as is contemplated for use in the presently disclosed system.

The circuitry of FIG. 3 overcomes this transformer/intersection requirement. In this embodiment, a single transformer 3–40 is connected between a row line 3–10, and a first 3–12, and a second 3–14 column line. The transformer 3–40 comprises a first 3–20 and a second 3–22 primary winding. (This could, of course, be a single center-tapped primary winding.) One end of each of the primary windings is commonly connected to the row line 3–10. The opposite ends of the primary windings are respectively coupled through a diode to a first and a second column line. Thus primary winding 3–20 is connected to column line 3–12 via diode 3–16, while primary winding 3–22 is connected by diode 3–18 to column line 3–14.

The transformer 3–40 has a single secondary 3–24 and serially connected with the first end of the winding is a diode 3–26. A first word line 3–30 is then connected from the diode 3–26 to the second end of the transformer secondary winding. Similarly, a second word line is serially connected with a diode 3–28 across the secondary. However, in this latter situation, the diode 3–28 is serially connected with the second end of the secondary.

With this configuration, a selection current flowing along row line 3–10 in the direction of the arrow would be initiated by the activation of a row driver (as shown in FIG. 1). Then depending upon whether a switch (not shown) associated with column lines 3–12 or 3–14 is activated, a particular primary winding 3–20 or 3–22 would be activated.

Figure 4:
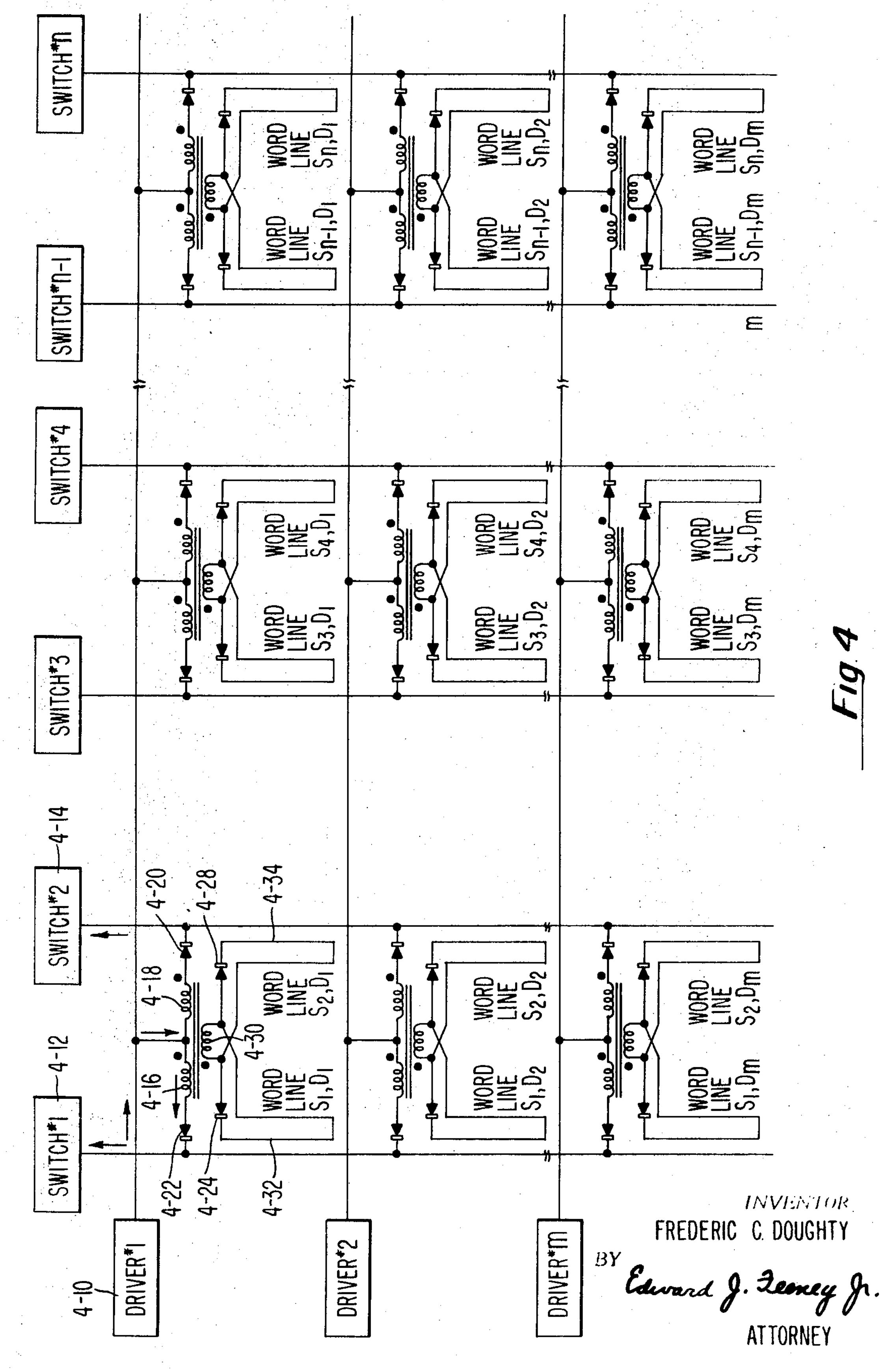
FIG. 4 is a detailed schematic diagram of a selection matrix with the circuitry of FIG. 3 shown interconnected at each pair of intersections.

The operation of this configuration is better understood upon consideration of FIG. 4. This figure illustrates a complete addressing matrix.

Only a single portion of the matrix has been given reference numerals, in view of the fact that the remaining elements are repetitious.

Consider first that the driver 4–10 and the switch 4–12 have been activated. The current from the driver passes along the row line in the direction indicated by the arrow. It then enters the primary winding 4–16, through the diode 4–22 and thereafter passes through the switch 4–12. The passage of this current through the primary winding 4–16 induces a current into the secondary winding 4–30 in a direction corresponding to the poled direction of diode 4–24 and consequently current will flow through word line 4–32. Alternately, if switch 4–14 were activated rather than switch 4–12, the current from driver 4–10 would then flow through primary winding 4–18 in the direction corresponding to the poled direction of diode 4–20. This, of course, would cause current flow in the secondary 4–30 in an opposite direction. Consequently a different word line is selected and current would flow in word line 4–32.

What has been shown and described is a memory matrix addressing apparatus which uses a double-duty transformer. The system uses a scheme which enables a single transformer to be connected to a pair of intersections rather than to an individual intersection. This permits the number of transformers used in prior art systems to be reduced in half.

It should be readily realized that many modifications may be made to the version of this concept presented herein without departing from the spirit of this invention. It is therefore to be understood that the present invention is to be limited only by the bounds set forth in the following claims.

1. A memory word line selection apparatus comprising a driver row, switch column matrix of $m$ row drivers and $n$ column switches, a plurality of line selection circuit means connected between each row driver and each successive pair of column switches such that said matrix includes $m$ $(n/2)$ line selection circuit means to select any one of a plurality of $mn$ word lines, each of said plurality of $m$ $(n/2)$ line selection means further comprising a transformer having a first and a second primary winding and a secondary winding one end of each primary winding commonly connected to row driver and the opposite ends of each winding individually and unidirectionally coupled to a respective pair of column switches, and said secondary winding is unidirectionally coupled to a first and unidirectionally coupled to a second word line such that the current flow in a first direction through said secondary selectively activates only one of said word lines and current flow in a second direction through said secondary winding selectively activates only the other word line.

2. The memory word line selection matrix as set forth in claim 1 wherein said transformer has a single center-tapped primary winding.

3. The memory word line matrix as set forth in claim 1 wherein said unidirectional coupling of said first and second primary windings respectively comprises individual connection of a first and a second diode between respective primary windings and said pair of column switches and said unidirectional coupling of said first and second word lines to said secondary winding comprises a third and a fourth diode serially connected between opposite ends of said secondary windings and one of said first and second word lines.

4. A circuit for reducing the number of transformers in an address selection matrix of driver row lines and switch column lines comprising a transformer having a center-tapped primary winding and a secondary winding, said center tap of the primary winding connected to a single-driver row line, a first diode connected between one end of said primary winding and a first switch column line, a second diode connected between the opposite end of said primary winding and a second switch column line, and a first and a second word drive line connected across said secondary for respective activation by the flow of current through secondary winding in a first and a second direction.

5. The circuit set forth in claim 4 wherein said first and said second word lines are respectively connected to said secondary via a third and a fourth diode, said third and fourth diodes each having one end respectively connected to opposite ends of the single secondary winding, one of said word drive lines connected to the opposite end of said third diode and directly to the other end of said single-secondary winding, and the other drive line connected to the opposite end of said fourth diode and directly to the opposite end of said single secondary.

6. The circuit as set forth in claim 5 wherein said third and fourth diodes are connected in a poled direction such that current flowing in one direction through the single secondary will activate one of said word drive lines and current in the other direction will activate the remaining word drive line.

7. A circuit for reducing the number of transformers in an address selection matrix of driver row lines and switch column lines comprising a transformer having a first and a second primary winding and a single secondary winding, said first and second primary windings each having one end commonly connected to a single driver row line, a first diode connected between the opposite end of said first primary winding and a first switch column line, said first diode being poled in a direction such that current will flow from said driver row line to said first switch column line, upon activation of said driver row line and said first switch column line a second diode connected between the opposite end of said second primary winding and a second switch column line, said second diode being poled in a direction such that current will flow from said driver row line to said second switch column line, a third and a fourth diode each having one end respectively connected to opposite ends of the single secondary winding, and a first and a second word drive line, one of said word drive lines connected to the opposite end of said third diode and directly to the other end of said single secondary winding, and the other drive line connected to the opposite end of said fourth diode and directly to the opposite end of said single secondary, said third and fourth diodes being poled in a direction such that current flowing in one direction through the single secondary will activate one of said word drive lines and current in the other direction will activate the remaining word drive line.

8. A memory word line selection apparatus comprising a driver row, switch column matrix of $m$ row drivers and $n$ column switches, a plurality of line selection circuit means connected between each row driver and each successive pair of column switches such that said matrix includes $mn$ word lines each of said circuit means further comprising a transformer having a first and a second primary winding and a single secondary winding, said first and second primary windings each having one end commonly connected to a single-driver row line, a first diode connected between the opposite end of said first primary winding and a first switch column line, said first diode being poled in a direction such that current will flow from said driver row line to said first switch column line, upon activation of said driver row line and said first switch column line a second diode connected between the opposite end of said second primary winding and a second switch column line, said second diode being poled in a direction such that current will flow from said driver row line to said second switch column line, a third and a fourth diode each having one end respectively connected to opposite ends of the single secondary winding, and a first and a second word drive line, one of said word drive lines connected to the opposite end of said third diode and directly to the other end of said single secondary winding, and the other drive line connected to the opposite end of said fourth diode and directly to the opposite end of said single secondary, said third and fourth diodes being poled in a direction such that current flowing in one direction through the single secondary will activate one of said word drive lines and current in the other direction will activate the remaining word drive line.

9. The memory word line selection apparatus as set forth in claim 8 wherein each of the word drive lines at each of said intersections is a thin film magnetic element.

10. The memory word line selection apparatus as set forth in claim 8 wherein each of said word drive lines has coupled to it a plurality of bistable magnetic square loop cores which cores are switched from one stable position to the other by the selected activation of one of said word lines.